US008029356B2

(12) United States Patent
Klein

(10) Patent No.: US 8,029,356 B2
(45) Date of Patent: Oct. 4, 2011

(54) NON-TRANSITIVE WAGERING GAME

(76) Inventor: Stanley Klein, Irvine, CA (US)

( * ) Notice: Subject to any disclaimer, the term of this patent is extended or adjusted under 35 U.S.C. 154(b) by 554 days.

(21) Appl. No.: 10/917,717

(22) Filed: Aug. 13, 2004

(65) Prior Publication Data

US 2006/0035702 A1 Feb. 16, 2006

(51) Int. Cl.
*A63F 13/00* (2006.01)

(52) U.S. Cl. ................ 463/22; 463/12; 463/13; 463/20; 463/21; 273/274; 273/292

(58) Field of Classification Search ................ 463/9–13, 463/16–22, 25–35, 46, 47; 273/146, 292, 273/309, 145 A, 274, 144 R, 145 R
See application file for complete search history.

(56) References Cited

U.S. PATENT DOCUMENTS 2,138,305 A * 11/1938 Null
2,293,331 A * 8/1942 Dahlberg
4,948,125 A * 8/1990 Mayes ...................... 273/148 R
5,090,706 A * 2/1992 Hokanson ..................... 273/248
5,133,559 A * 7/1992 Page ............................ 273/274
5,169,148 A * 12/1992 Wheeler ....................... 273/146
5,551,697 A * 9/1996 Willenbring .................. 273/244
5,641,165 A * 6/1997 Page ............................ 273/246
5,695,193 A * 12/1997 Cheung ......................... 273/274
5,839,960 A * 11/1998 Parra et al. ...................... 463/41
6,164,651 A * 12/2000 Webb ............................ 273/274
6,241,250 B1 * 6/2001 Webb ............................ 273/292
6,428,005 B2 * 8/2002 Au-Yeung ..................... 273/274
6,488,284 B2 * 12/2002 Webb ............................ 273/274
(Continued)

FOREIGN PATENT DOCUMENTS

GB 2138305 A * 10/1984
(Continued)

OTHER PUBLICATIONS

Description of Applicant's pre-filing activities set forth in IDS letter filed Aug. 20, 2008.

*Primary Examiner* — Peter DungBa Vo
*Assistant Examiner* — Sunit Pandya
(74) *Attorney, Agent, or Firm* — Howard & Howard Attorneys PLLC

(57) ABSTRACT

Disclosed is a non-transitive casino game which utilizes a group of non-transitive gaming devices, One embodiment uses dice. Accordingly, each pair of dice has advantage over one other pair of non-transitive dice in the group. Each pair of dice has a different color to allow a banker or dealer to identify the hierarchy of the dice. In a table game version, a player first selects one pair of non-transitive dice from a group of non-transitive dice. A dealer then selects one of the remaining pair of the non-transitive dice. The dealer's selection ensures the dealer dice have a better than fifty percent advantage over the player-selected dice, neglecting any ties. A game comprises the player rolling the player-selected dice and the dealer rolling the dealer selected dice three successive times. Each of the player roll outcomes are compared to the corresponding dealer roll outcomes. Players are able to wager on either the player or dealer, and on a number of ties and other related outcomes. Another embodiment employs non-transitive card decks. The method of play is exactly the same as in the dice embodiment, except that the card decks must be shuffled after every card is dealt.

22 Claims, 8 Drawing Sheets

U.S. PATENT DOCUMENTS

| | | | | |
|---|---|---|---|---|
| 6,550,771 | B1 * | 4/2003 | Weaver et al. | |
| 6,656,047 | B1 * | 12/2003 | Tarantino et al. | 463/22 |
| 6,776,413 | B2 * | 8/2004 | Brown, III | 273/146 |
| 6,808,172 | B2 * | 10/2004 | Bedford et al. | 273/255 |
| 2001/0022430 | A1 * | 9/2001 | Promutico | 273/274 |
| 2003/0075864 | A1 * | 4/2003 | Swavy et al. | 273/146 |
| 2003/0085520 | A1 * | 5/2003 | Bedford et al. | 273/255 |
| 2004/0130094 | A1 * | 7/2004 | Hunter | 273/146 |
| 2004/0140613 | A1 * | 7/2004 | Brown, III et al. | |
| 2004/0143614 | A1 * | 7/2004 | Rarick | 708/250 |

FOREIGN PATENT DOCUMENTS

| | | | |
|---|---|---|---|
| GB | 2293331 | A * | 3/1996 |

* cited by examiner

300

| | | | | | |
|---|---|---|---|---|---|
| RED (A1) | 2 2 3 4 5 6 | BLUE (B1) | 1 2 5 5 5 6 | AMBER (C1) | 1 1 1 4 6 6 |
| RED (A2) | 2 2 2 2 5 6 | BLUE (B3) | 1 1 3 3 4 4 | AMBER (C2) | 2 2 3 4 5 6 |

THREE PAIR OF NON-TRANSITIVE DICE -- INDICIA FOR EACH CUBE

FIG. 2

310

| | | | | | |
|---|---|---|---|---|---|
| B TIES A | 10.64815% | C TIES B | 10.64815% | A TIES C | 10.26235% |
| B BEATS A | 45.21605% | C BEATS B | 45.37037% | A BEATS C | 45.44753% |
| A BEATS B | 44.13580% | B BEATS C | 43.98148% | C BEATS A | 44.29012% |

SINGLE-ROLL PROBABILITIES FOR THE THREE PAIR OF NON-TRANSITIVE DICE

FIG. 2A

312

HOUSE ADVANTAGE FOR WAGERS IN A 3-ROLL GAME
(IN PERCENT)

| | THE TWO PAIRS IN PLAY | | | |
|---|---|---|---|---|
| GAME WAGERS | A,B | B,C | C,A | AVERAGE OF 3 COMBINATIONS |
| 1 TO 1 PLAYER | 1.602 | 2.060 | 1.718 | 1.793 |
| 1 TO 1 BANKER | 1.586 | 1.128 | 1.381 | 1.365 |
| AVERAGE 1 TO 1 PAYOFF | 1.594 | 1.594 | 1.550 | 1.579 |
| 5 TO 1 PAYOFF | 4.540 | 4.547 | 7.975 | 5.687 |
| 10 TO 1 PAYOFF | 5.427 | 6.416 | 4.432 | 5.425 |
| 30 TO 1 PAYOFF | 2.039 | 2.039 | 8.757 | 4.278 |
| 750 TO 1 PAYOFF | 9.330 | 9.330 | 18.883 | 12.514 |

FIG. 2B

315

NON-TRANSITIVE CASINO GAME - 3 CARD DECKS & HOUSE ADVANTAGES

| CARD VALUES: | 1 | 2 | 3 | 4 | 5 | 6 | 7 | 8 | 9 | 10 | 11 |
|---|---|---|---|---|---|---|---|---|---|---|---|
| DECK A COMPOSITION: | 0 | 4 | 13 | 7 | 6 | 19 | 13 | 1 | 4 | 6 | 2 |
| DECK B COMPOSITION: | 4 | 4 | 5 | 7 | 13 | 12 | 10 | 17 | 3 | 0 | 0 |
| DECK C COMPOSITION: | 2 | 9 | 7 | 7 | 11 | 8 | 10 | 6 | 10 | 4 | 1 |

75 CARDS IN EACH DECK

SINGLE CARD DEAL PROBABILITIES:

DECKS IN PLAY: (B,A)

| B>A | A>B | B=A |
|---|---|---|
| 0.4522667 | 0.4419555 | 0.1057778 |

DECKS IN PLAY: (C,B)

| C>B | B>C | C=B |
|---|---|---|
| 0.4519112 | 0.4416000 | 0.1064889 |

DECKS IN PLAY: (A,C)

| A>C | C>A | A=C |
|---|---|---|
| 0.4524445 | 0.4416000 | 0.1059556 |

320

TABLE GAME WAGERS AND THEIR ASSOCIATED HOUSE ADVANTAGES
(IN PERCENT)

| | DECKS IN PLAY | | | AVERAGE OF ALL |
|---|---|---|---|---|
| | A,B | B,C | C,A | 3 COMBINATIONS |
| 1 TO 1 PLAYER | 1.529 | 1.529 | 1.608 | 1.555 |
| 1 TO 1 BANKER | 1.642 | 1.659 | 1.567 | 1.623 |
| AVERAGE 1 TO 1 PAYOFF | 1.586 | 1.594 | 1.588 | 1.589 |
| PUSH - 5 TO 1 PAYOFF | 5.165 | 4.532 | 5.008 | 4.902 |
| TRIPLE PPP - 10 TO 1 PAYOFF | 5.043 | 5.272 | 5.272 | 5.196 |
| TWO OR THREE TIES - 30 TO 1 PAYOFF | 3.281 | 2.026 | 2.968 | 2.758 |
| THREE TIES - 750 TO 1 PAYOFF | 11.116 | 9.311 | 10.667 | 10.365 |

*FIG. 2C*

NON-TRANSITIVE WAGERING GAME

FIELD OF THE INVENTION

The embodiments of the present invention relate to a wagering game. More particularly, the embodiments of the present invention relate to a fast action casino game utilizing three non-transitive gaming objects.

BACKGROUND

As gaming continues to enjoy widespread acceptance, casinos are increasingly in need of new games of chance to retain and attract patrons. While electronic gaming devices (e.g., slot machines) attract the most attention, many players prefer the skill requirements and personal interaction of live gaming. Thus, live gaming continues to be an integral component to the success of any casino.

Heretofore, the overwhelming majority of table games have utilized playing cards to facilitate the underlying wagering game. For example, Blackjack, Let it Ride®, Three Card Poker and Caribbean Stud Poker each utilize playing cards. The only popular dice game utilizing dice is craps. Pai Gow is a game which uses dice but only for determining the first player to receive the cards. Unfortunately, the craps table requires a large amount of space and the game itself can be intimidating to non-experienced players. For example, craps offers a myriad of wagers based on the outcomes of single rolls and a plurality of successive rolls. Moreover, craps is fast-paced which puts additional pressure on non-experienced players.

A familiar drawback to current table games is the absence of a large, winnable payout. While Caribbean Stud Poker and Let it Ride® have large potential payouts for poker hands like a straight flush and royal flush, the chances of obtaining these hands are so remote that it becomes almost irrelevant to serious players. Additionally, the large payout wagers have very significant house edges.

Consequently, there continues to be a need for new live table games that are fast-paced, simple to play and that have attainable, and large winnable payouts with reasonable house advantages. Advantageously, the new non-transitive game is designed to be played on a conventional Blackjack type table. Two detailed embodiments are offered, one using non-transitive pairs of dice, the other, non-transitive decks of cards.

SUMMARY

Accordingly, a first embodiment of the present invention utilizes a group of three pair of differently colored (e.g., red, blue and amber) non-transitive dice and a second embodiment utilizes three non-transitive decks of cards. Non-transitive means that there exists a circular, rather than a linear, relationship among the group of objects. So, there must be at least three objects in the group in order to have a non-transitive relationship among them. In gaming the non-transitive relationship is "beats" (or "loses to"). In other words, the group of dice pairs is non-transitive if and only if each pair of dice loses to one of the other pair of dice in the group. That is, each pair of the non-transitive dice will be outscored by one of the other dice pair more than 50% of the time, neglecting any ties. Accordingly, with a first embodiment of the present invention, a player first selects or designates which pair of non-transitive dice will be used for play against the house. Then, the banker/dealer selects from the remaining two pair of non-transitive dice. Since the banker/dealer is educated regarding the non-transitive dice, he or she selects that particular pair of the remaining two non-transitive dice pair, which he or she knows has the advantage over the player-selected non-transitive dice pair.

To facilitate the first embodiment of the present invention, a Blackjack type table layout depicts multiple wagering areas. The wagering areas include a player or banker/dealer wager (these two wagers are mutually exclusive), a push wager, a triple-player-win wager, a double-tie wager and a triple-tie wager. In the first embodiment, each game comprises three rolls of two pair of the dice; a player rolls one pair and another pair is rolled by the banker/dealer. As used herein the terms "dealer" and "banker" are used synonymously. The two wagers on the player or banker/dealer are dependent upon whether the player or the banker/dealer will obtain a higher score on at least two out of the three outcomes and are obviously mutually exclusive. The winning player or banker/dealer wagers both pay 1 to 1 or even money. A push occurs when neither the player nor banker/dealer wins two of the three outcomes. The push wager pays 5 to 1. The player and banker/dealer wagers both result in no play on a push outcome. That is, the player retains the original wager but does not win anything on the player or banker/dealer wager. However, in order to maintain a house edge on the banker/dealer wager, a banker/dealer wager will lose one half of their bet if the game results in a push outcome and there is one player win and one banker win and the player win occurs before the banker win. Clearly, this rule could alternatively require that the banker win occur before the player win and the offering casino can decide which rule to use. Other wagers include a double-tie wager, which pays 30 to 1, a triple-tie wager, which pays 750 to 1, and a triple-player-win wager, which pays 10 to 1. To track and record game play, the table layout also depicts player, banker and tie indicators for each of the three roll outcomes. Based on the above noted features, the embodiments of the present invention provide a very fast-paced game since there are no player decisions once the two non-transitive gaming objects in play are selected and wagers have been placed. The game has a house edge on the even-money wagers, which is comparable to baccarat and attractive to players and acceptable to the house or casino.

In order to make the game fast-paced, only one player seated at the table plays against the house during a game. All players seated at the table may place wagers on either "P" for player or "B" for the bank (as well as the other wagers discussed above). This is exactly the same betting style of Baccarat. Whether the player actually rolls the "player-dice" or only designates (by pointing to) the "player dice" container, which the dealer then subsequently rolls for the player, is not critical for the operation of the game. It is quite likely, however, that players will want to actively participate in the game by actually shaking the player-selected dice container.

Because casinos are extremely concerned about cheating, a dice game designed for play on a Blackjack-style table offers unique challenges for the casino. Most likely, casinos will require the dice to be "rolled" or shaken in either totally closed containers (e.g. Chuck-A-Luck cages) or in partially enclosed containers (e.g. dice cups). Dice cups that allow the dice to roll out on the table surface are not seen as a preferred method of rolling because of the security compromises such player access to the dice present. And while enclosed dice shakers or rolling devices already exist they tend to be quite expensive. Because the new non-transitive game requires three dice shakers, and since minimizing game cost to offering casinos is of great priority, one embodiment of the present invention uses proprietary, sealed, transparent low-cost dice shakers. Not only is the new dice shaker lower in cost than existing devices, it also "rolls" the dice in a more random manner.

Optionally, a non-transparent sleeve or cover, placed over the shaker during the shaking process, provides additional concealment of the dice "rolls" or "outcomes" within the shakers both during and after the shaking process. The purpose of the sleeve is to prevent last moment "adjustments" to the dice outcome (should the player observe a low numerical outcome) and thus should minimize disputes with the casino personnel. Nobody can possibly know the outcome of the "roll" until the sleeve is completely removed from the shaker to reveal the dice outcome. The sleeve is removed only after the dice and the dice shaker container are completely at rest upon the table surface The dice shakers prevent players and the banker/dealer from directly handling the dice. This method of "rolling" the dice also virtually eliminates any physical contamination of the dice with drinks, cigarette ashes, nicks from jewelry, or any other foreign object interaction. Furthermore, the risk or appearance of cheating is virtually eliminated. This method of rolling dice also increases the duty cycle of the dice, thereby reducing the cost to the casino for dice replacement as well as reducing the time casino personnel are required to spend to perform periodic dice inspections.

Other features, embodiments and variations will become evident from the following detailed description, drawings and claims.

BRIEF DESCRIPTION OF THE DRAWINGS

FIG. 2 shows a chart detailing indicia of each of three pair of non-transitive dice;

FIG. 2*a* shows the single-roll probabilities associated with the dice numbering scheme detailed in FIG. 2;

FIG. 2*b* shows a chart detailing the associated game probabilities for a three-roll dice game embodiment using the three dice pair of FIG. 2;

FIG. 2*c* shows a chart detailing a three non-transitive card deck embodiment and the associated probabilities for a three-deal card game;

DETAILED DESCRIPTION

Figure 1:
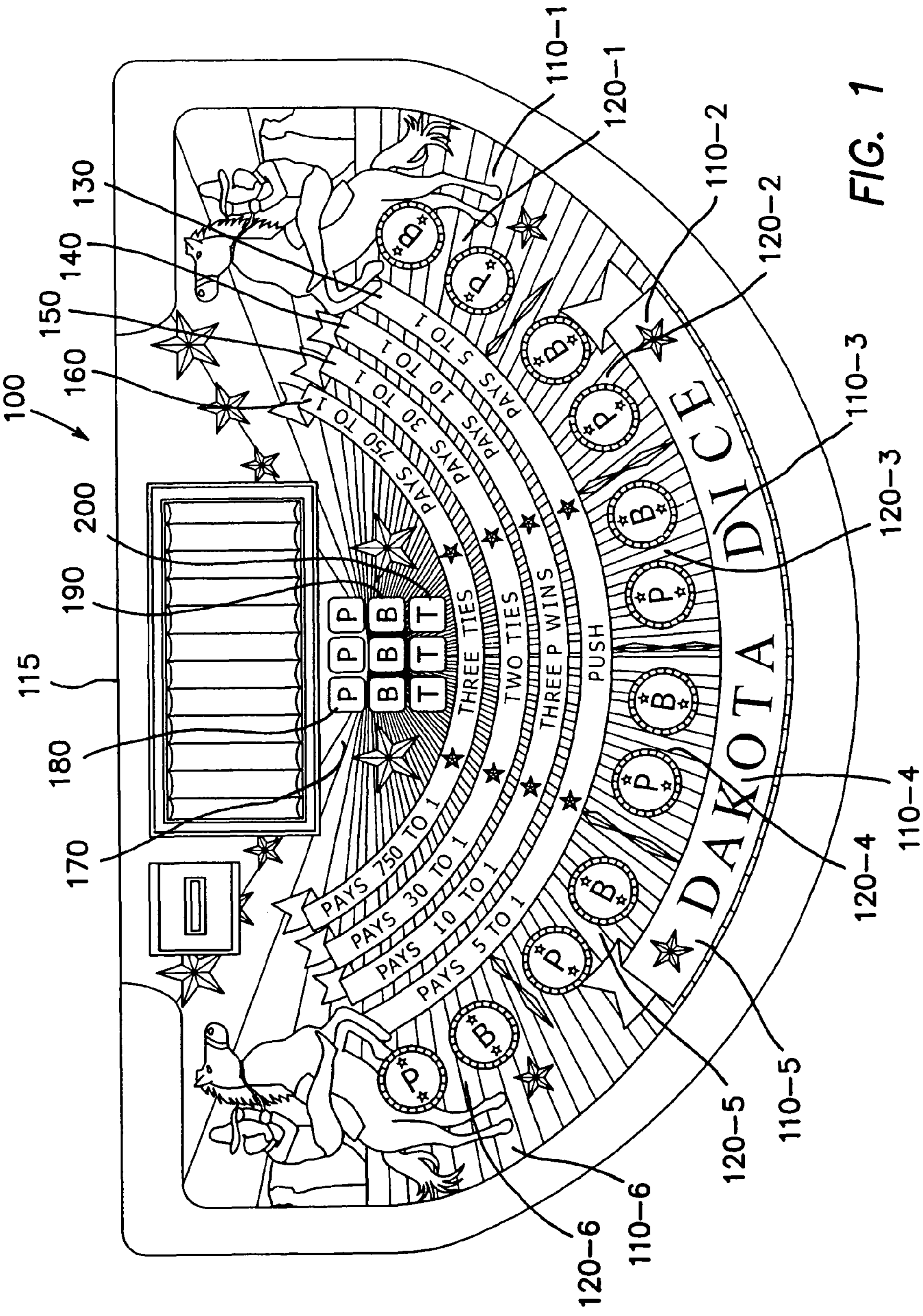
FIG. 1 shows a gaming table layout of a live embodiment of the present invention.

Reference is now made to the figures wherein like parts are referred to by like numerals throughout. FIG. 1 shows a gaming table layout generally referred to by reference numeral 100. The layout 100 accommodates six player positions 110-1 through 110-6 and a dealer position 115. The layout 100 depicts six player (P) and banker/dealer (B) wager areas 120-1 through 120-6, a push wager area 130, a triple-player-win wager area 140, a double tie wager area 150 and a triple tie wager area 160. The wager areas may also include associated payouts. To track play of the game, a series of result icons 170, namely a player (P) win 180, banker (B) win 190 or tie (T) 200, are depicted near a center of the layout 100. As described below, the result icons 170 permit the banker/dealer to temporarily record the results of three successive rolls of the game dice. It is conceivable that the results may be tracked using other means including an electronic display device similar to those used with Roulette and Baccarat A first embodiment of the present invention is facilitated by a group of six-sided non-transitive dice. In a first embodiment, the group comprises three pair of non-transitive dice. The group comprises three uniquely colored pair of dice (e.g., red, blue and amber). One example of the non-transitive numbering of the dice is illustrated in chart 300 of FIG. 2. Specifically, the dice numbering is such that, on average, the score outcomes of the red pair are beaten by the score outcomes of the blue pair, the score outcomes of the blue pair are beaten by the score outcomes of the amber pair and the score outcomes of the amber pair are beaten by the score outcomes of the red pair. Specific probabilities related to the non-transitive numbering of FIG. 2 are shown in the chart 310 of FIG. 2*a*. Those skilled in the art will understand that many other non-transitive numbering schemes are possible without departing from the spirit and scope of the present invention. For a three-roll game, the house advantages for all of the game wagers are shown chart 312 in FIG. 2*b*.

A second embodiment of the new non-transitive casino game employs three decks of specially constructed card decks. Exactly as in the three-dice-pair embodiment, there are three non-transitive objects, in this case, card decks: A, B and C. Arbitrarily, each card deck is constructed out of 75 cards but the three decks each have very different card compositions. The three card decks are constructed to have the non-transitive property so that, on average, a single card dealt from Deck B will beat a single card dealt from Deck A, and a single card dealt from Deck C will, on average, beat a single card dealt from Deck B. Similarly, on average, a single card dealt from Deck A will beat a single card dealt from Deck C. The exact deck compositions and the single card probabilities for but one example are shown in a top portion 315 of FIG. 2*c*. Like the dice embodiment, there are only eleven possible integer results that can appear as an outcome. With the dice, the lowest number on each cube is a 1 so in the pair total, the lowest number to occur is a 2. And the largest numerical outcome that a dice pair can total (using standard dice pips) is 12. So, there are only eleven distinct integer outcomes that can occur.

For the non-transitive three-card-deck embodiment, integers one through eleven inclusive, are used. One way to implement or distinguish the ones and elevens is to simply assign all red aces the value one and all black aces the value eleven. In this way, all three of the non-transitive three-deck embodiment can be constructed out of multiple, standard single card decks. Note, however, that Deck A consumes 5 standard card decks because it requires 19 sixes.

The lower portion 320 of FIG. 2*c* shows the house advantage for all of the wagers associated with the three-card-deck and three-card-deal embodiment of the new non-transitive casino game. The game and method of play is exactly the same game (whoever wins 2 out of 3 outcomes wins) as in the three-dice-pair embodiment. Accordingly, the dealer deals the player a single card from the player-selected deck and the dealer deals the house a single card from the dealer-selected deck. Thus, three successive card match-ups between the player and the dealer comprise a single game.

When comparing the three non-transitive card deck house advantage results with the three non-transitive dice pair results of FIG. 2*b*, it is apparent that there is considerably less fluctuation in the house advantages among the three non-transitive card combinations (B, A), (C, B) and (A, C). Of course, this should not be surprising since there are 75 independent and distinct elements (cards) to "play with" in constructing each of the three card decks. In the three-dice-pair embodiment there are only 6 elements, one for each face on each cube, which gives rise to 36 combinations, which are not independent.

Figure 3:
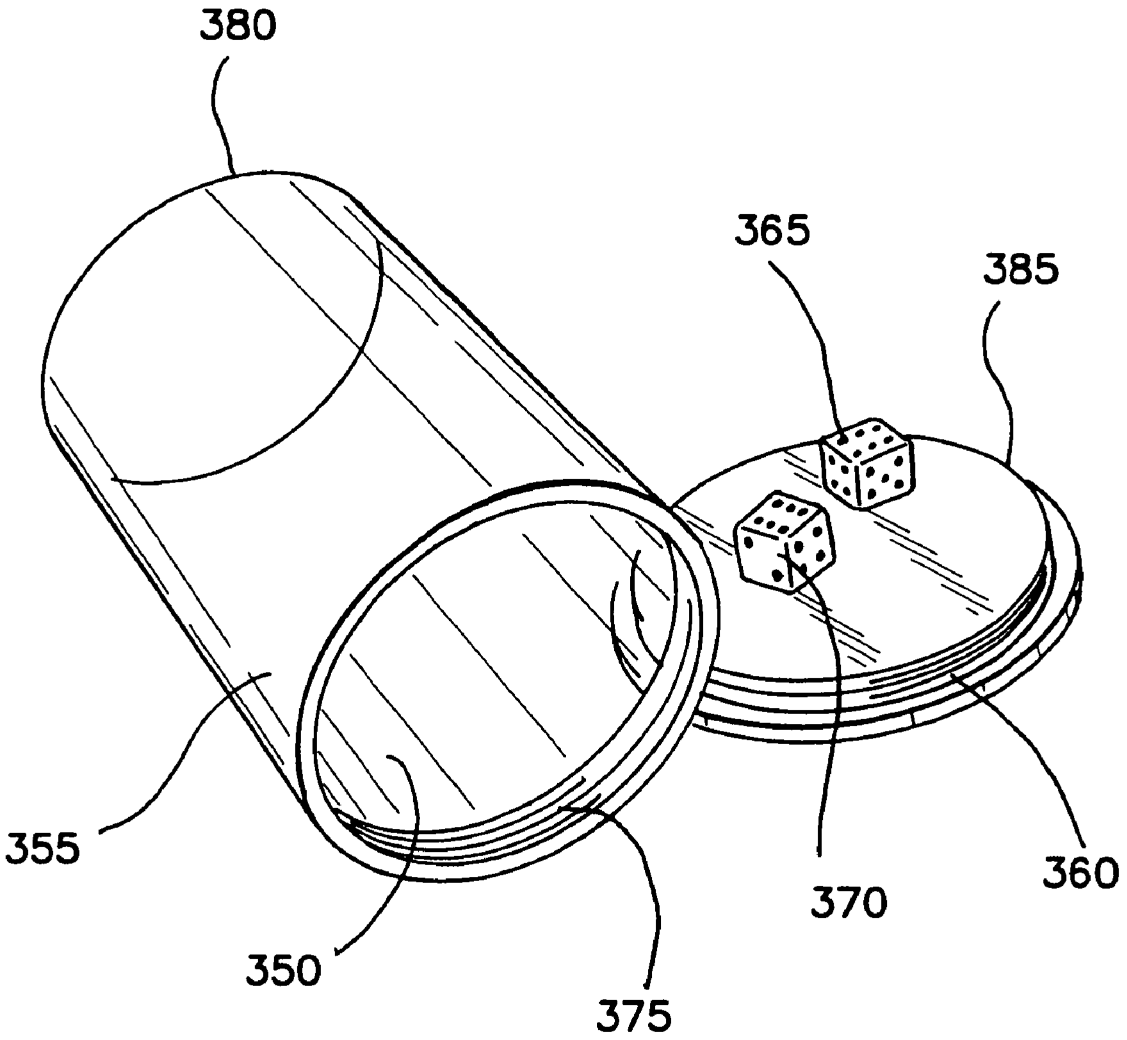
FIG. 3 shows a dice shaker for facilitating one or more of the embodiments of the present invention.

FIG. 3 shows a dice shaker 350 for facilitating the live table game embodiment of the present invention. The shaker 350 comprises a transparent cylindrical housing 355 having an open end. An end cap 360 acts to seal the dice 365 within the housing 355. Although the end cap 360 may be joined to the housing 355 in any number of ways, as shown in FIG. 3, the end cap 360 includes a threaded lip 370 for receipt by a threaded upper portion 375 of the housing 355. One key feature of the new dice shaker 350 is the rubber-like inserts used to cover both the fixed bottom 380 of the housing 355 and an underside 385 of the end cap 360 in which the rubber-like disk is recessed into the cap 360. The material used in the present embodiment of the shaker is EVA (ethylene vinyl acetate), a copolymer member of the polyolefin family derived from random copolymerization of vinyl acetate and ethylene resulting in a resin with similar properties to that of polyethylene but with greater flexibility and resistance to impact and elongation. Because of EVA's resiliency, the dice achieve very high velocities during the shaking process which virtually guarantees randomness in the outcomes when the dice come to rest on the shaker bottom. This soft material also prevents damage to the dice 365 and reduces the noise level associated with operation of the shaker 350.

Figure 4:
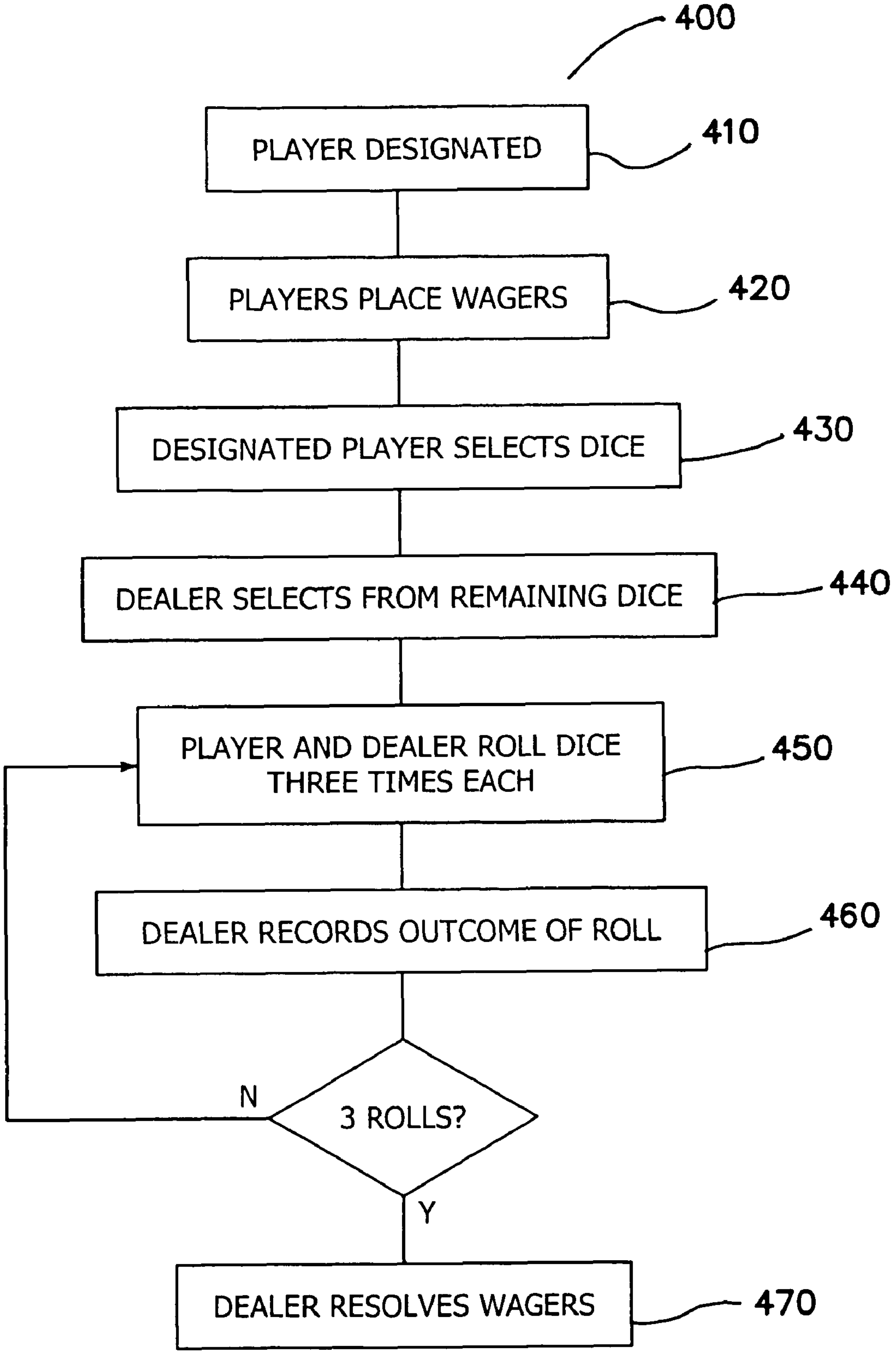
FIG. 4 shows a flow chart detailing one method of play of a live embodiment of the present invention.

FIG. 4 shows a flow chart 400 detailing a first method of play of a live embodiment of the present invention. At step 410, a player is designated as a player dice roller. The designated player acts as the proxy roller for all player bettors at the table. The casino offering the game will determine the number of games which any one designated player may roll. The casino may alternatively require that the dealer roll for the designated player, allowing the designated player to only select the dice that will be used for the player. If the casino permits the player to actually roll the dice, the player may be permitted to roll for only one game or a series of games. At step 420, players place wagers on either the player or the banker/dealer. Optionally, players may also place proposition wagers on the occurrence of a push, double tie, triple tie and/or three consecutive player wins. An allowable range of wager amounts is established by individual casinos. Steps 410 and 420 may be reversed without impacting the game. However, by designating the player before wagers are placed, the other players at the table are able to use past results of the designated player roller to determine whether to wager on the player or the banker/dealer. While the past results have no scientific relevance to the upcoming rolls, players tend to be superstitious and look for reasons to justify their wager. The various wagers have corresponding payouts as follows:

| | |
|---|---|
| Player or Banker/Dealer | 1 to 1 |
| Push | 5 to 1 |
| Triple-player-win | 10 to 1 |
| Double Tie | 30 to 1 |
| Triple Tie | 750 to 1 |

Next, at step 430, the designated player selects one pair of non-transitive dice from the three available pair of dice. It is noted that the player is able to select new dice after each game. In fact, depending on the casino offering the game, the player may be able to change dice during a game. In any event, ideally, the dice are contained in a transparent dice shaker as shown in FIG. 3. Then, at step 440, the banker/dealer specifically selects the one pair of remaining dice which, on average, has the advantage over the player-selected dice. That is, since the banker/dealer knows which pair of remaining dice has the advantage over the player-selected pair of dice, he or she is able to select the same. For example, assuming the dice hierarchy noted above, if the player selects the blue pair of dice, the banker/dealer must select the amber pair of dice. Once the dice pairs are selected, at step 450, the player and the banker/dealer utilize their respective shakers 350 to roll the contained dice 365. Ideally, the player and the banker/dealer roll the dice simultaneously. However, there is no reason that the banker/dealer cannot roll before the player or vice versa. Subsequent to the first roll, at step 460, the banker/dealer records the outcome of the first roll by placing a marker on one of the result icons 170. Consequently, the banker/dealer must place the marker on the player (P) win icon 180, banker (B) win icon 190 or tie (T) icon 200. Once three rolls have been completed and recorded, the banker/dealer resolves the player wagers at step 470.

The player or banker/dealer wagers are based on the scoring outcomes of the three rolls. More particularly, a player wager wins if the player outscores the dealer on at least two of the three rolls and the banker/dealer wager wins if the dealer outscores the player on at least two of three rolls. Winning player or banker/dealer wagers pay even money (i.e., 1 to 1). A push wager wins when neither the player nor the banker/dealer outscores the other on two of the three rolls. Specifically, a push occurs when the player wins one roll, the banker/dealer wins one roll and the other roll is a tie or when the player and banker/dealer tie on two or three rolls. A winning push wager pays 5 to 1. Since the non-transitive dice provide the house with the edge, there must be a mechanism for ensuring the player-placed banker/dealer wager favors the house. Thus, in every case except three, a push results in no action (i.e., the player retains his or her original wager) for the player and banker/dealer wagers. To create the house edge on the banker/dealer wager, any push outcome consisting of one of the following three roll sequences: PBT, PTB, and TPB, results in the banker/dealer bettor losing one half of their bet on the banker/dealer wager. Those skilled in the art will recognize that another sequence (e.g., BPT, BTP, and TBP) can be substituted for the above three banker/wager sequences.

Other proposition wagers include wagers on the player outscoring the banker/dealer each of the three consecutive rolls, two ties occurring during the three rolls and three ties occurring during the three rolls. The aforementioned wagers pay 10 to 1, 30 to 1 and 750 to 1, respectively. It is unusual to find a 750 to 1 payout on a live table game. Moreover, considering the number of games which can be played over the course of one day, the three ties outcome should occur about once per eight hour shift. Clearly, the wagers and corresponding payouts may be manipulated to the satisfaction of the casinos offering the game.

Figure 5:
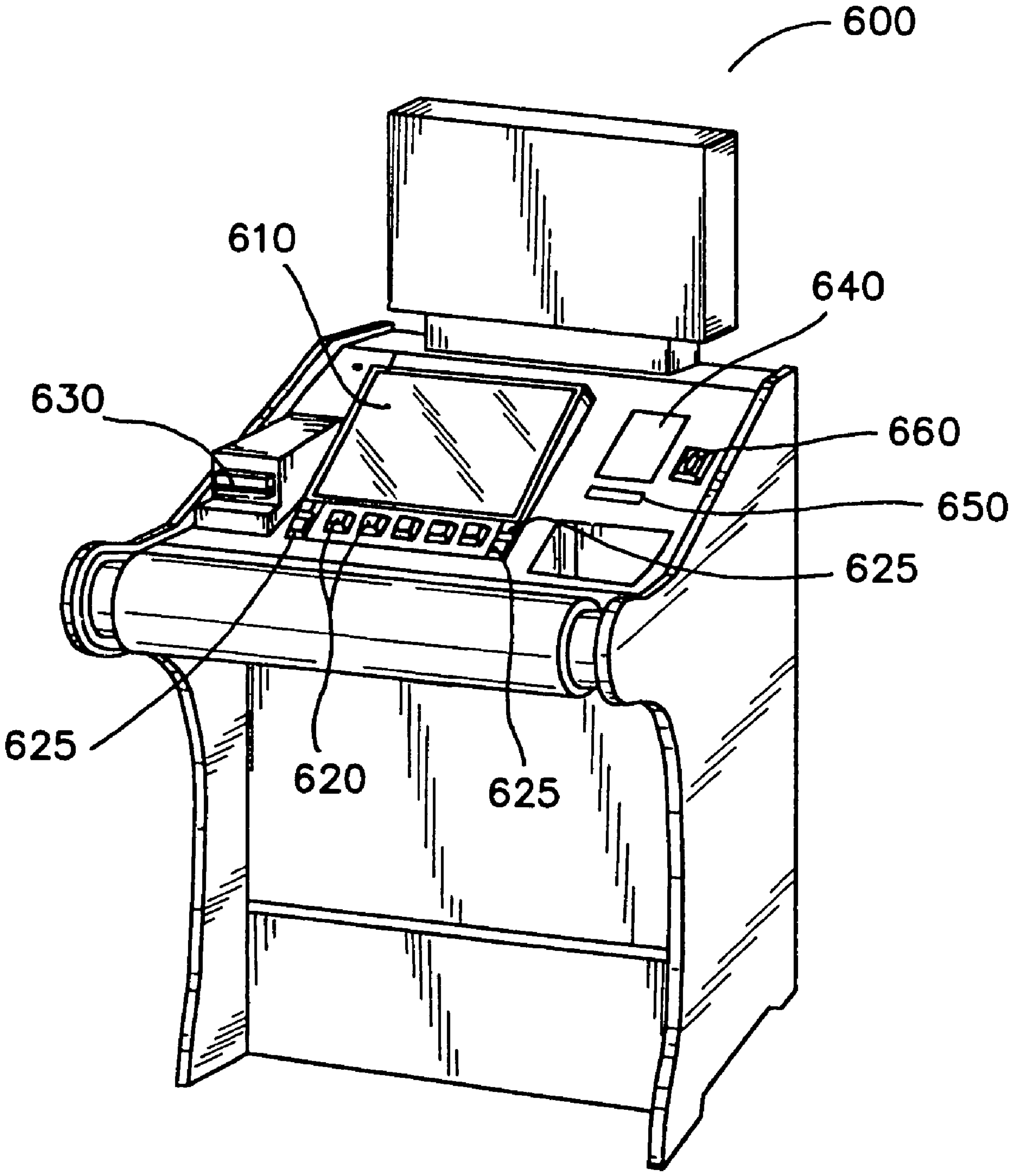
FIG. 5 shows a gaming device of the type which may facilitate an electronic embodiment of the present invention.

FIG. 5 illustrates an electronic gaming device, generally designated as reference numeral 600, of the type that may be used to implement the embodiments of the present invention in an electronic format. The external features of the gaming device 600 include a display 610, wager selection buttons 620, dice selection buttons 625, card reader 630, credit display 640, bill reader 650 and coin input 660. However, the display 610 may also comprise touch screen technology to facilitate simple player interaction. Device switches and similar physical components may also act as player interfaces.

The operation of the gaming device 600 is controlled by a microprocessor that communicates with an internal memory device and the external features of the device 600. The microprocessor also incorporates, or communicates with, a random number generator which ensures the randomness of the rolled dice during the play of the game. Since the technology for operating and controlling gaming devices is well known to those skilled in the art, the subtle details are not described herein.

Accordingly, in an electronic embodiment of the present invention, a player places or inputs his or her wagers and selects his or her pair of dice. The device processor then selects, according to the non-transitive hierarchy, the proper pair of dice from the two remaining pair of dice and simulates the three dice rolls for both the player and the device. The processor records the results of each roll and resolves the player wagers. Two inherent benefits of the electronic embodiment over a live game are the speed at which the game can be played and the elimination of cheating associated with physical dice.

Figure 6:
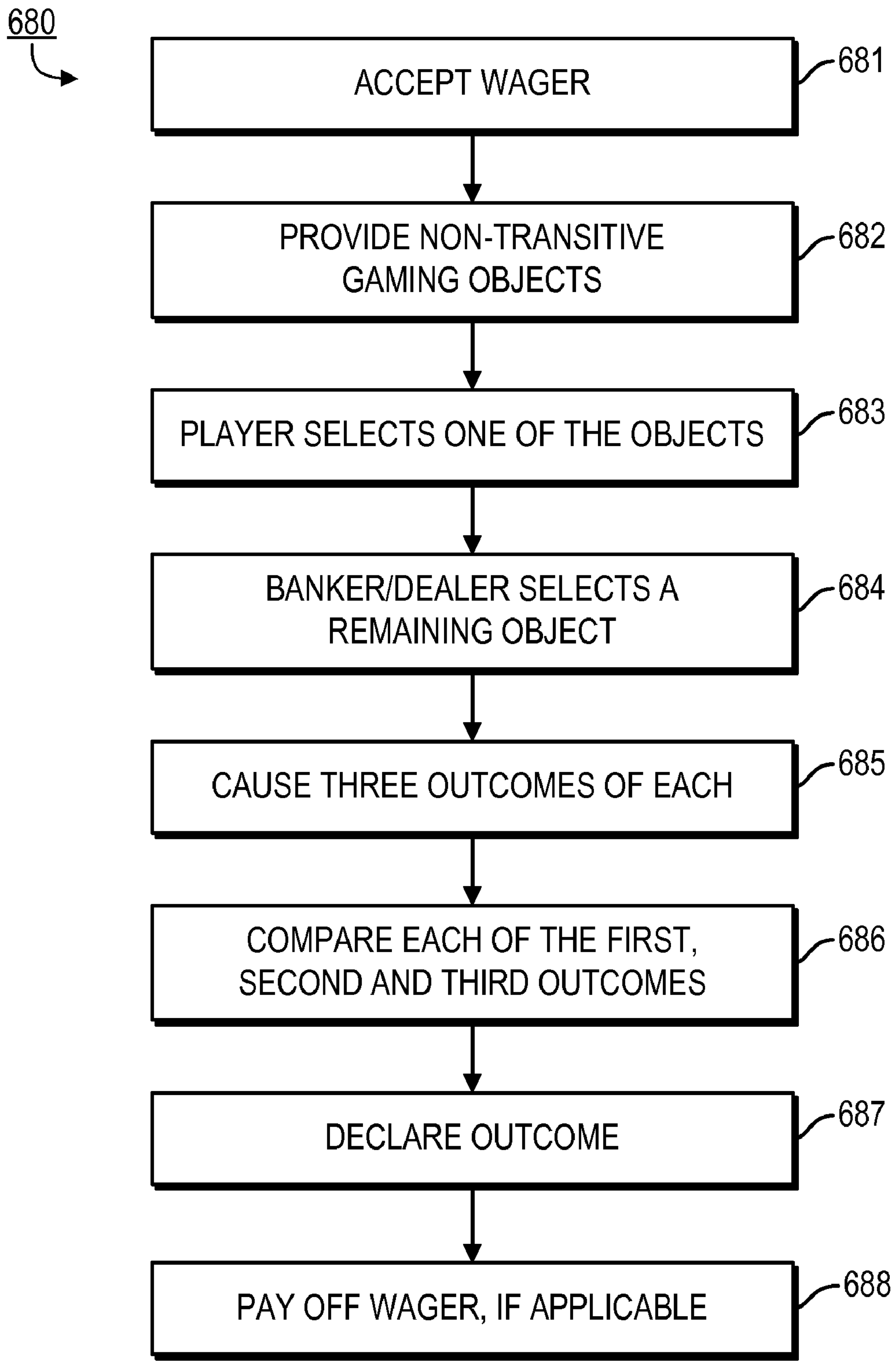
FIG. 6 is a flow diagram illustrating a method of play according to an alternate embodiment of the present invention.

FIG. 6 summarizes a method 680 of play according to an embodiment of the present invention discussed above. Initially, in step 681 a wager, selected from among a set of available wagers that includes at least one of: a player wager and a banker/dealer wager, is accepted. In step 682, a group of at least three non-transitive gaming objects is provided. In step 683, a player is allowed to select one of the non-transitive gaming objects. In step 684, the banker/dealer is allowed to select one of the remaining non-transitive gaming objects. In step 685, three outcomes of the player-selected non-transitive gaming object are made to occur, resulting in a corresponding first player outcome, second player outcome and third player outcome, and three outcomes of the banker/dealer-selected non-transitive gaming object are made to occur, resulting in a corresponding first banker/dealer outcome, second banker/dealer outcome and third banker/dealer outcome. In step 686, each of the first, second and third player outcomes is compared to the first, second and third banker/dealer outcomes, respectively. In step 687, the outcome is declared as a player win, a banker/dealer win or a tie, as applicable, based on each such comparison. Finally, in step 688, the player wager, if accepted, is paid off only if the comparing and declaring results in at least two player wins, and the banker/dealer wager, if accepted, is paid off only if the comparing and declaring results in at least two banker/dealer wins.

Figure 7:
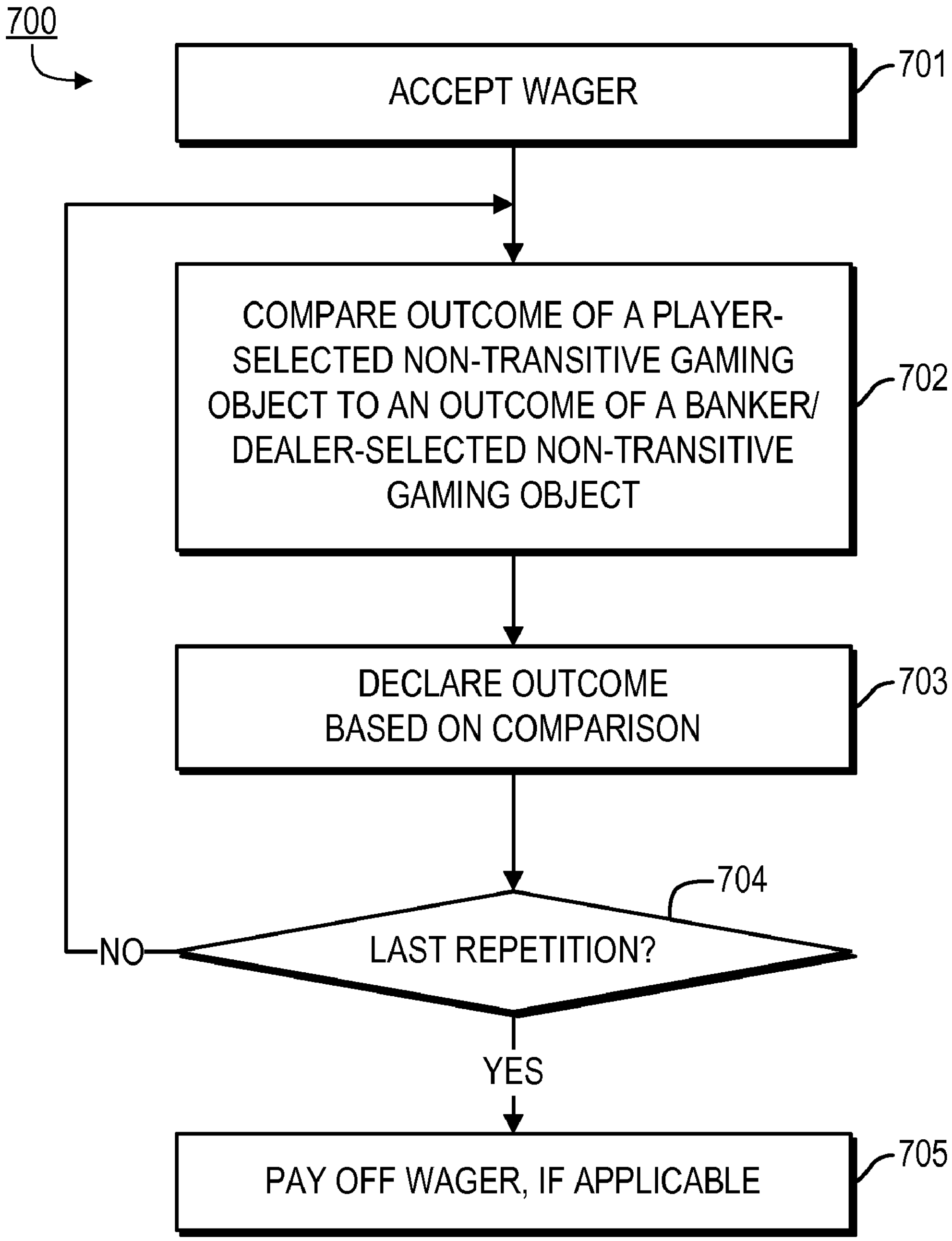
FIG. 7 is a flow diagram illustrating a method of play according to a still further embodiment of the present invention.

FIG. 7 summarizes a method 700 according to a further embodiment of the present invention discussed above. Initially, in step 701 a wager, selected from among a set of available wagers that includes at least one of a player wager and a banker/dealer wager, is accepted. In step 702, an outcome of a player-selected non-transitive gaming object is compared to an outcome of a banker/dealer-selected non-transitive gaming object. In step 703, the outcome is declared as a player win, a banker/dealer win or a tie, as applicable, based on the comparison. Step 704 causes the comparing step and the declaring step to be repeated for a number of repetitions. In step 705, the player wager, if accepted, is paid off only if at least two player wins result from three such repetitions of the comparing step and the declaring step, and the banker/dealer wager, if accepted, is paid off only if at least two banker/dealer wins result from three such repetitions of the comparing step and the declaring step. According to this embodiment, a player selects the player-selected non-transitive gaming object from a group of non-transitive gaming objects and thereafter the banker/dealer selects the banker/dealer-selected non-transitive gaming object from among the remaining non-transitive gaming objects in the group.

Other embodiments of the game are clearly possible. For example, three differently-colored electronic modules or "pucks" each having an embedded random number generator and a series of light-emitting diodes (LEDs) or digital displays can replace the three pairs of dice or three decks of cards. In the same manner as the dice or cards, the random number generators are programmed in a non-transitive manner. The player selects his or her electronic unit, followed by the banker/dealer selecting his or her unit. The electronic pucks, or units, are then activated and display their non-transitive outcomes. The outcomes may be akin to dice outcomes such that the display shows conventional dice pips. Alternatively, the electronic units may allow non-integer outcomes (e.g. 4.5) to be displayed. The use of non-integer outcomes allows for very precise manipulation of the probabilities and corresponding payouts.

Also, three differently colored decks of non-transitive cards can be constructed to replace the three dice pairs. Just as the electronic puck embodiment allows more fine-tuning of the non-transitive probabilities, so does this embodiment of the game but to a somewhat lesser extent since the cards must still have integer values. While this more precise "fine tuning" is advantageous, there are some disadvantages with the card decks embodiment. One is that the three decks would have to be composed carefully each shift and checked routinely to verify that no modifications in composition have occurred. (That is, that no cheating has taken place.) Another is that the decks of cards would have to be shuffled after every game. This latter requirement would probably necessitate the use of two automatic shuffling machines so that the game is not slowed down significantly.

While the description above focuses on three rolls per game, the number of rolls may be more or less. Also, the numbers on the non-transitive dice may be modified along with the disclosed payouts.

Although the invention has been described in detail with reference to several embodiments, additional variations and modifications exist within the scope and spirit of the invention as described and defined in the following claims.

I claim:

1. A method of playing a wagering game, comprising the steps of:

a) receiving one or more wagers relating to a final game outcome of the wagering game involving a group of at least three sets of dice having a non-transitive relationship among sets thereof, wherein the non-transitive relationship refers to each set of dice in the group being configured to have higher roll values in at least greater than about 50% of roll outcomes over time excluding ties as compared with another set of dice in the group and wherein the final outcome may either be a player win, a bank win or a push;

b) receiving a selection of the first set of non-transitive dice from a group of at least three sets of dice having a non-transitive relationship among sets thereof, wherein the selected first set of non-transitive dice is used for determining a player roll value;

c) selecting a second set of non-transitive dice from the group of at least two remaining sets of non-transitive dice responsive to the selection of the first set of non-transitive dice, wherein the selected second set of non-transitive dice is used for determining a bank roll value;

d) determining a player roll value and a bank roll value by rolling the first and second sets of non-transitive dice, respectively;

e) comparing the player roll value with the bank roll value to determine a roll outcome, wherein the roll outcome is a player win if the player roll value is greater than the bank roll value, a bank win if the bank roll value is greater than the player roll value or a tie if the player roll value and bank roll value are the same;

f) determining a final game outcome based on one or more roll outcomes, wherein the final game outcome is a player win if at least there are more player wins than bank wins in the one or more roll outcomes, the final game outcome is a bank win if at least there are more bank wins than player wins in the one or more roll outcomes, and the final game outcome is a push if neither the player win condition nor the bank win condition for the final game outcome is met; and g) awarding game payouts if any of the one or more wagers correspond to the final game outcome.

2. A method according to claim 1, further comprising the step of providing a group of three sets of dice having a non-transitive relationship among sets thereof.

3. A method according to claim 1, further comprising the step of providing at least three sets of non-transitive dice wherein each set includes dice of a different color.

4. A method according to claim 1, further comprising the step of providing at least three sets of non-transitive dice wherein each set is a pair of six-sided dice.

5. A method according to claim 1, wherein the step of selecting a second set of dice from the at least two sets of remaining non-transitive dice responsive to the selection of the first set of non-transitive dice further comprises automatically selecting the second set of non-transitive dice from the remaining sets of non-transitive dice based on the non-transitive relationship among the sets of non-transitive dice in the group.

6. A method according to claim 1, wherein the step of selecting a second set of dice from the at least two remaining sets of non-transitive dice responsive to the selection of the first set of non-transitive dice further comprises selecting the set of non-transitive dice which is likely to result in a roll outcome of a bank win.

7. A method according to claim 1, wherein the step of selecting a second set of non-transitive dice from the at least two remaining non-transitive sets of dice responsive to the selection of the first set of non-transitive dice further comprises selecting the second set of non-transitive dice that is configured to result in a higher roll value than the roll value of the first set of dice in at least more than 50% of the roll outcomes, excluding ties.

8. A method according to claim 1, wherein the step of receiving one or more wagers relating to a final game outcome of the wagering game further comprises receiving a wager relating to the number of roll outcomes that are ties.

9. A method according to claim 1, wherein the step of receiving one or more wagers relating to a final game outcome of the wagering game further comprises receiving a wager relating to the number of roll outcomes that are player wins.

10. A method according to claim 1, wherein the step of receiving one or more wagers relating to a final game outcome of the wagering game further comprises receiving a wager relating to the number of roll outcomes that are bank wins.

11. A method according to claim 1, wherein the step of receiving a selection of a first set of non-transitive dice from a group of at least three sets of dice having a non-transitive relationship among sets thereof further comprises receiving the selection from a player.

12. A method according to claim 1, further comprising the step of displaying the result of each roll outcome.

13. A method according to claim 1, wherein the step of awarding game payouts if any of the one or more wagers correspond with the final game outcome further comprises the step of awarding a game payout comprising a fraction of a wager received if the wager received is not related to the final outcome being a push and the final outcome is a push.

14. A method according to claim 1, wherein the one or more roll outcomes is three.

15. A method according to claim 1, wherein the lowest possible roll value of at least one of the at least three sets of non-transitive dice in the group is 2 and the highest possible roll value of at least one of the at least three sets of non-transitive dice in the group is 12.

16. A system for playing a wagering game comprising:

a) a data input device configured for:

i) receiving one or more wagers relating to a final game outcome of the wagering game involving a group of at least three sets of dice having a non-transitive relationship among sets thereof, wherein the non-transitive relationship refers to each set of dice in the group being configured to have higher roll values in at least greater than about 50% of roll outcomes over time excluding ties as compared with another set of dice in the group and wherein the final outcome may either a player win, a bank win or a push;

ii) receiving a selection of a first set of non-transitive dice from the group of at least three sets of dice having a non-transitive relationship among sets thereof, wherein the selected first set of non-transitive dice is operatively associated with determining a player roll value;

b) a processor configured for:

i) selecting a second set of non-transitive dice from the group of at least two remaining sets of non-transitive dice responsive to the selection of the first set of non-transitive dice, wherein the selected second set of non-transitive dice is operatively associated with determining a bank roll value;

ii) determining a player roll value and a bank roll value through communication with a random number generator configured to simulate rolling the first and second sets of non-transitive dice, respectively;

iii) comparing the player roll value with the bank roll value to determine a roll outcome, wherein the roll outcome is a player win if the player roll value is greater than the bank roll value, a bank win if the bank roll value is greater than the player roll value or a tie if the player roll value and bank roll value are the same;

iv) determining a final game outcome based on one or more roll outcomes, wherein the final game outcome is a player win if at least there are more player wins than bank wins in the one or more roll outcomes, the final game outcome is a bank win if at least there are more bank wins than player wins in the one or more roll outcomes, and the final game outcome is a push if neither the player win condition nor the bank win condition for the final game outcome is met; and c) a player crediting device configured for awarding game payouts if any of the one or more wagers received correspond with the final game outcome.

17. A system as recited in claim 16, further comprising a display device configured for displaying the group of at least three sets of non-transitive dice available for selection by players.

18. A system as recited in claim 17, wherein the display device displays the result of each roll outcome.

19. A system as recited in claim 16, wherein the processor is configured to automatically select the second set of non-transitive dice from the remaining sets of non-transitive dice based on the non-transitive relationship among the sets of non-transitive dice in the group.

20. A system as recited in claim 16, wherein the processor is configured to select the set of non-transitive dice which is likely to result in a roll outcome of a bank win as the second set of non-transitive dice.

21. A system as recited in claim 16, wherein the processor is configured to select the set of non-transitive dice that is configured to result in a higher roll value than the roll value of the first set of dice in at least more than 50% of the roll outcomes, excluding ties.

22. A system according to claim 16, wherein the data input device, processor and player crediting device are mounted within an electronic gaming machine cabinet.

* * * * *